(12) United States Patent
Wu et al.

(10) Patent No.: US 10,418,630 B2
(45) Date of Patent: Sep. 17, 2019

(54) LITHIUM-SULFUR BATTERY CELL ELECTRODE

(71) Applicant: FORD GLOBAL TECHNOLOGIES, LLC, Dearborn, MI (US)

(72) Inventors: Feng Wu, Beijing (CN); Renjie Chen, Beijing (CN); Ji Qian, Beijing (CN); Yusheng Ye, Beijing (CN); Xiao Guang Yang, Northville, MI (US); YuHong Xu, Jiangsu (CN); Theodore James Miller, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 15/210,080

(22) Filed: Jul. 14, 2016

(65) Prior Publication Data

US 2018/0019471 A1   Jan. 18, 2018

(51) Int. Cl.
| | |
|---|---|
| *H01M 4/583* | (2010.01) |
| *H01M 10/0565* | (2010.01) |
| *H01M 4/133* | (2010.01) |
| *H01M 4/134* | (2010.01) |
| *H01M 4/38* | (2006.01) |
| *H01M 4/02* | (2006.01) |
| *H01M 4/136* | (2010.01) |
| *H01M 4/587* | (2010.01) |

(52) U.S. Cl.
CPC ........... *H01M 4/583* (2013.01); *H01M 4/133* (2013.01); *H01M 4/134* (2013.01); *H01M 4/136* (2013.01); *H01M 4/38* (2013.01); *H01M 4/382* (2013.01); *H01M 4/587* (2013.01); *H01M 10/0565* (2013.01); *H01M 2004/021* (2013.01); *H01M 2004/027* (2013.01); *H01M 2004/028* (2013.01); *H01M 2300/0082* (2013.01)

(58) Field of Classification Search
CPC ...... H01M 4/133; H01M 4/136; H01M 4/583; H01M 4/587
See application file for complete search history.

(56) References Cited

U.S. PATENT DOCUMENTS

| | | | |
|---|---|---|---|
| 9,123,941 B2 | 9/2015 | Visco et al. | |
| 9,203,084 B2 | 12/2015 | Wang et al. | |
| 2002/0045102 A1* | 4/2002 | Jung | H01M 4/02 429/324 |
| 2014/0010475 A1 | 1/2014 | Crandall et al. | |
| 2014/0017569 A1 | 1/2014 | Wang et al. | |
| 2014/0141328 A1 | 5/2014 | Dai et al. | |

(Continued)

FOREIGN PATENT DOCUMENTS

WO   2015/176051 A1   11/2015

OTHER PUBLICATIONS

Yang Xie et al., "Effect of Boron-Doping on the Graphene Aerogel Used as Cathode for the Lithium-Sulfur Battery," Applied Materials & Interfaces, http://pubs.acs.org/doi/abs/10.1021/acsami.5b08129?journalCode=aamick, 2 pages.

*Primary Examiner* — Stephan J Essex
(74) *Attorney, Agent, or Firm* — David Kelley; Brooks Kushman P.C.

(57) ABSTRACT

A lithium-sulfur battery cell includes a lithium anode and a carbon-sulfur cathode including a sulfur-impregnated carbon nanostructure defined by one or more layers of elementally doped nanoporous carbon arranged on one or more carbon nanotubes.

18 Claims, 4 Drawing Sheets

(56) References Cited

U.S. PATENT DOCUMENTS

| | | | | |
|---|---|---|---|---|
| 2014/0342234 A1* | 11/2014 | Guo | ................... | H01M 10/052 |
| | | | | 429/231.4 |
| 2015/0084603 A1 | 3/2015 | Thillaiyan et al. | | |
| 2015/0349310 A1* | 12/2015 | Viner | ..................... | C08G 75/00 |
| | | | | 429/126 |
| 2016/0013463 A1* | 1/2016 | Roumi | ................ | G01R 31/361 |
| | | | | 429/145 |
| 2016/0064773 A1* | 3/2016 | Choi | ................ | H01M 10/0565 |
| | | | | 429/303 |
| 2016/0087306 A1* | 3/2016 | Lee | ................... | H01M 10/0565 |
| | | | | 429/317 |

* cited by examiner

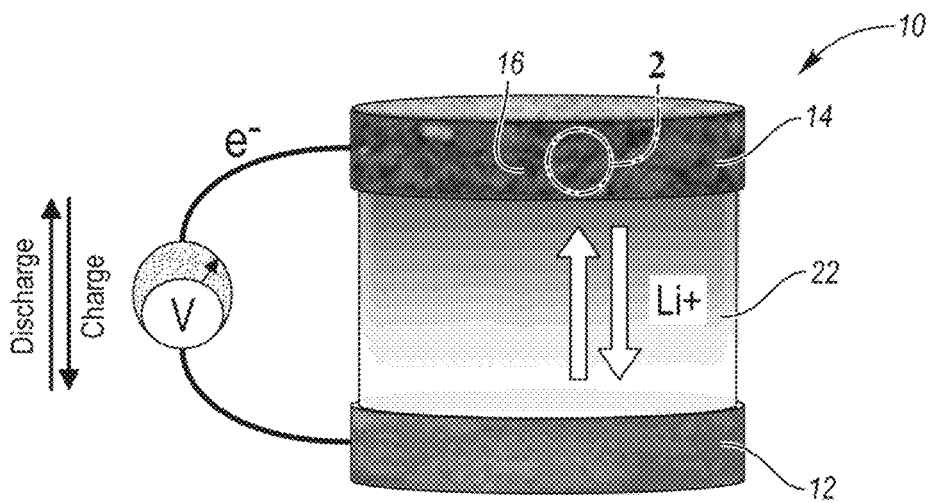
FIG. 1
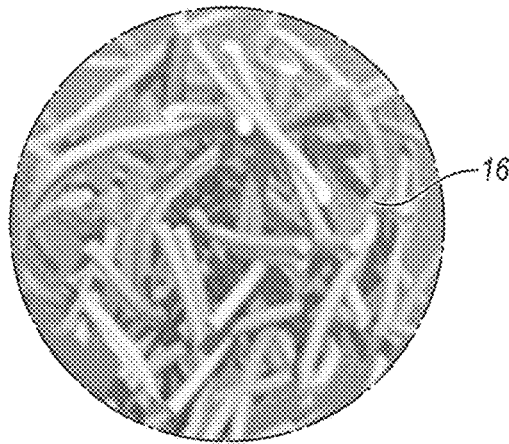
FIG. 2
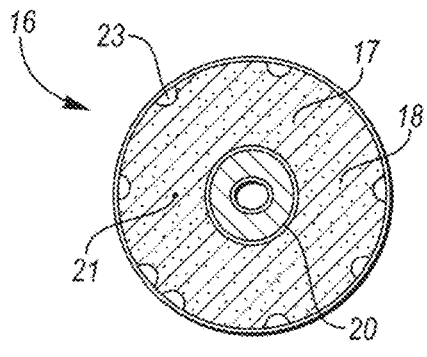     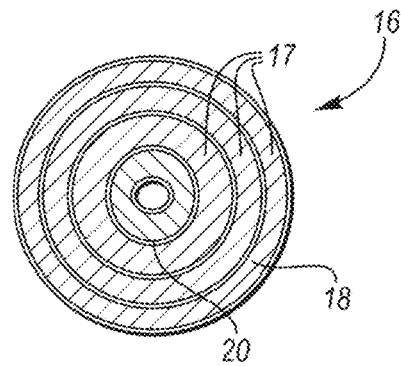
FIG. 3A                FIG. 3B

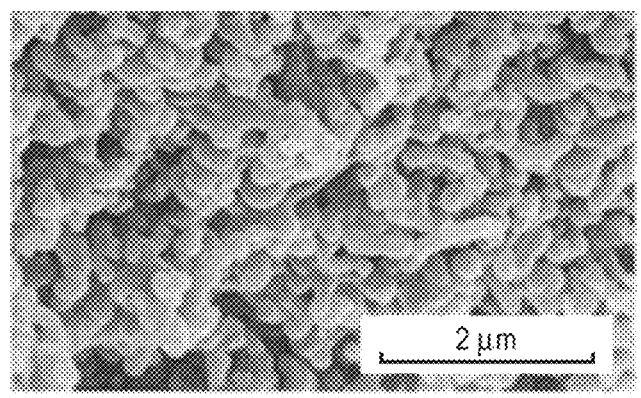
FIG. 7
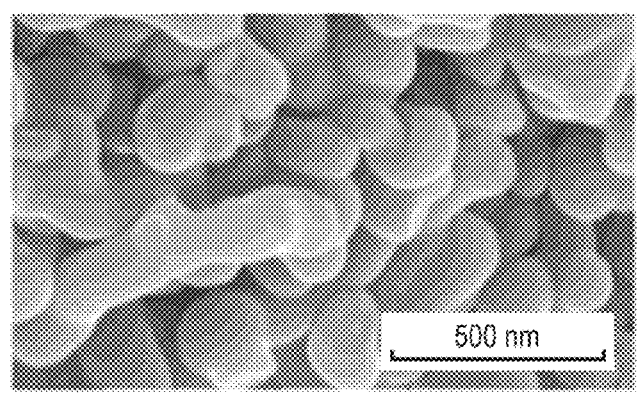
FIG. 8
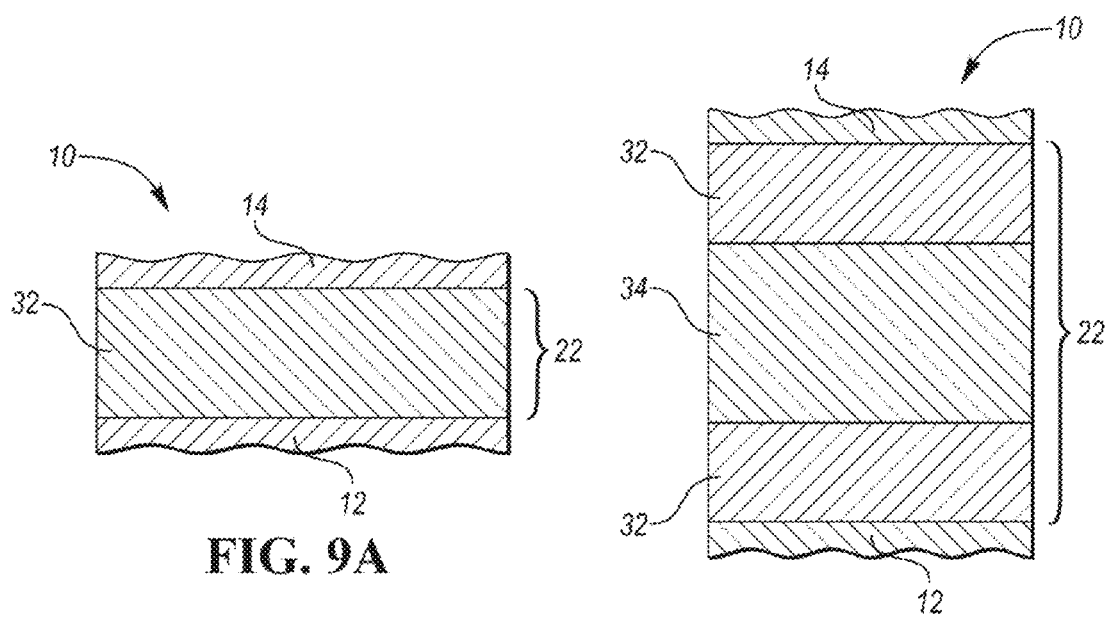
FIG. 9A
FIG. 9B

LITHIUM-SULFUR BATTERY CELL ELECTRODE

TECHNICAL FIELD

The present disclosure relates to a lithium-sulfur battery cell electrode and a process of making the same.

BACKGROUND

A rechargeable lithium-sulfur (Li—S) battery is of considerable interest due to a high theoretical specific capacity of sulfur of about 1675 mAh/g. Thus, the Li—S battery is a promising electrochemical system to replace current lithium-ion and nickel metal hydride batteries presently used in electrified vehicles. In addition, the active material, sulfur, is highly abundant, nontoxic, and relatively cheap which makes the Li—S battery even more attractive for energy storage applications. Yet, performance issues relating to the Li—S battery power density, cycle life, relatively poor reversibility and electrochemical stability have prevented a large scale use of the Li—S batteries.

SUMMARY

According to one embodiment, a lithium-sulfur battery cell is disclosed. The battery cell includes a lithium anode. The cell further includes a carbon-sulfur cathode including a sulfur-impregnated carbon nanostructure defined by one or more layers of elementally doped nanoporous carbon arranged on one or more carbon nanotubes. The elementally doped nanoporous carbon may be doped with boron. The one or more carbon nanotubes and the elementally doped nanoporous carbon layers may be coaxial. The elementally doped nanoporous carbon layers may be arranged as an outer layer of the carbon nanostructure surrounding the one or more carbon nanotubes. The carbon nanostructure may include active sites configured to trap lithium polysulfide intermediates during charge-discharge of the battery. The carbon nanostructure may have a tubular morphology. A pore size of the elementally doped nanoporous carbon may be about 0.30 nm to 1 nm. The carbon nanostructure may have a BET specific surface of about 400 to 500 m²/g. Sulfur may be uniformly distributed throughout the carbon nanostructure.

In another embodiment, a lithium-sulphur battery cell is disclosed. The battery cell may include a lithium anode and a carbon-sulfur cathode. The battery cell may further include a solid or gel polymer electrolyte. The electrolyte may be configured to inhibit dissolution of lithium polysulfide intermediates in the electrolyte and prevent deposition of the intermediates on the anode. The electrolyte may include poly(vinylidenefluoride-hexafluoropropylene) and hydrophilic ceramic particles. The ceramic particles may be silicon dioxide particles. The battery cell may further include 1-ethyl-3-methylimidazolium-bis (trifluoromethyl-sulfonyl)imide. The battery cell may include about 1-50 wt. % of a liquid electrolyte, based on the total weight of the solid or gel polymer electrolyte. The solid or gel electrolyte may be surrounded by the liquid electrolyte. Porosity of the cathode may be about 15-25%.

In a yet another embodiment, a lithium-sulfur battery cell is disclosed. The battery cell may include a lithium anode, a carbon-sulfur cathode, and a non-liquid electrolyte. The carbon-sulfur cathode may include a sulfur-impregnated carbon nanostructure defined by one or more layers of elementally doped nanoporous carbon arranged on one or more carbon nanotubes. The non-liquid electrolyte may be configured to inhibit dissolution of lithium polysulfide intermediates in the electrolyte and prevent deposition of the intermediates on the anode. The non-liquid electrolyte may include poly(vinylidenefluoride-hexafluoropropylene), hydrophilic ceramic particles, and optionally include 1-ethyl-3-methylimidazolium-bis (trifluoromethyl-sulfonyl) imide. The elementally doped nanoporous carbon may be doped with boron. A pore size of the elementally doped nanoporous carbon may be about 0.30 nm to 1 nm. The elementally doped nanoporous carbon layers may be arranged as an outer layer of the carbon nanostructure surrounding the one or more carbon nanotubes.

BRIEF DESCRIPTION OF THE DRAWINGS

FIG. 1 depicts a schematic Li—S battery cell having a cathode and an anode structured according to one or more embodiments;

FIG. 2 shows a detailed schematic view of a portion of a cathode of the battery cell depicted in FIG. 1 illustrating sulfur-impregnated carbon nanostructures forming the cathodic material;

FIG. 3A depicts a schematic cross-sectional view of an example sulfur-impregnated carbon nanostructure having one layer of nanoporous carbon surrounding a carbon nanotube;

FIG. 3B depicts a schematic cross-sectional view of an alternative example sulfur-impregnated carbon nanostructure having multiple layers of nanoporous carbon surrounding a carbon nanotube;

FIGS. 6-8 are SEM images of carbon nanostructures;

FIG. 9A shows a schematic cross-sectional view of an example gel-ceramic electrolyte having a ceramic membrane;

FIG. 9B shows a schematic cross-sectional view of an alternative example gel-ceramic electrolyte having a substrate membrane and a plurality of ceramic membranes;

DETAILED DESCRIPTION

Figure 4:
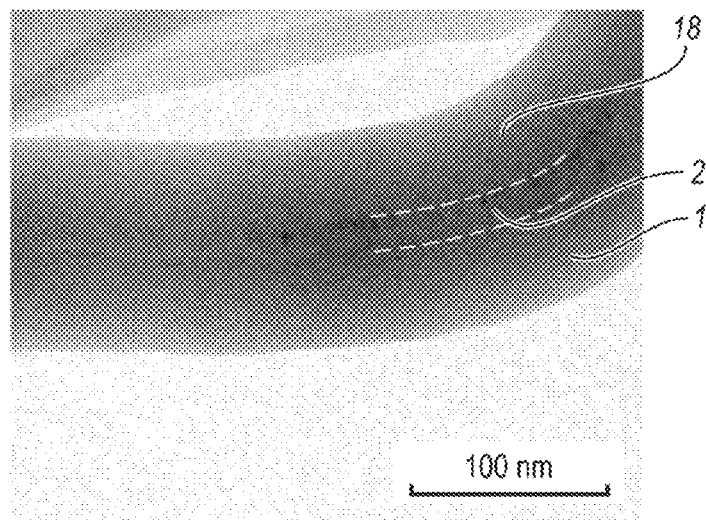
FIG. 4 is a scanning electron microscope (SEM) image of a carbon nanostructure.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating amounts of material or conditions of reaction and/or use are to be understood as modified by the word "about" in describing the broadest scope of the present invention.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Typical Li—S batteries include a carbon-sulfur cathode and a lithium anode. While sulfur has the advantages referenced above, sulfur has a very low conductivity. Adding carbon to the cathode thus provides an effective electron conduction path as well as structural integrity, but at the disadvantage of higher cost and lower energy density.

Chemical processes in the Li—S battery include lithium dissolution from the anode surface and incorporation into alkali metal polysulfide salts during discharge, and reverse lithium plating to the anode during charge. Each sulfur atom can host two lithium ions. Typically, lithium-ion batteries accommodate only 0.5-0.7 lithium ions per host atom. Consequently, Li—S allows for a much higher lithium storage density than lithium-ion batteries.

In a Li—S battery, polysulfides are reduced on the cathode surface in a sequence while the cell is discharging:

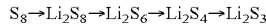

$S_8 \rightarrow Li_2S_8 \rightarrow Li_2S_6 \rightarrow Li_2S_4 \rightarrow Li_2S_3$ The Li—S battery typically includes a porous diffusion separator across which the polysulfides form at the cathode as the cell charges:

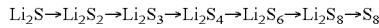

$Li_2S \rightarrow Li_2S_2 \rightarrow Li_2S_3 \rightarrow Li_2S_4 \rightarrow Li_2S_6 \rightarrow Li_2S_8 \rightarrow S_8$ Despite the fact that Li—S battery cells were proposed more than 30 years ago, a large-scale deployment of Li—S batteries has been limited by several performance issues relating to the Li—S battery power density, cycle life, and relatively poor reversibility and electrochemical stability. The insulating nature of sulfur and its product lithium sulfide makes the Li—S battery difficult to charge and discharge in a fast manner. The intermittent reaction products, lithium polysulfides, are also prone to dissolve in the battery's electrolyte which contributes to poor cycling efficiency and capacity retention. Additionally, a so-called "shuttle effect" referring to movement of polysulfide ions between electrodes presents another issue impairing the cycle life of the Li—S battery.

Depending on the state of charge of the battery cell, various polysulfide species will be present at the cathode. Typically, the higher order polysulfides, $S_8^{2-}$, $S_6^{2-}$, and $S_4^{2-}$ are soluble in the electrolyte. These species diffuse from the cathode to the anode through a separator where they are reduced and where they induce the shuttle effect. If the polysulfide species are reduced to insoluble species at the anode, precipitates of sulfides will be formed, resulting in an irreversible capacity loss. Besides unwanted consumption of the lithium metal anode, the shuttle effect also causes a loss of the active sulfur material and lowers the coulombic efficiency of the battery.

Recently, various methods of resolving the above-mentioned disadvantages have been developed. For example, an electrolyte additive such as $LiNO_3$ has been incorporated into the battery electrolyte to suppress the polysulfide shuttle. Yet $LiNO_3$ is consumed over time to form a protective solid-electrolyte layer on the lithium anode, and thus presents only a temporary solution.

Various electrode structure modifications aimed at encapsulating and sequestering soluble polysulfide species have also been proposed. Alternatively, introduction of novel cathode materials such as polymer coated sulfur composites, modification of electrode engineering methods, or incorporation of functional polymer binders have been explored as options to overcome the above-mentioned problems.

Additional attempts have been made to improve the electrical conductivity and to accommodate electrode volume expansion during the battery cell operation by incorporating sulfur into different carbon matrixes, especially carbon nanomaterials including carbon nanotubes, graphene, and porous carbon of the cathode. For example, sulfur coated carbon nanotubes (CNTs) have been applied in Li—S structures. Yet, CNTs, whose surface is coated with sulfur, have several disadvantages such as a relatively fast capacity decay, relatively low coulombic efficiency, and a relatively poor rate capability. Improved electrochemical performance has been reported regarding CNTs treated with nitric acid to incorporate carboxyl functional groups, but a relatively lower surface area and pore volume of CNTs are an inherent problem of the CNT-sulfur-coated cathodes.

Therefore, a need remains to reduce the polysulfide shuttle effect in Li—S batteries. It would also be desirable to improve the discharge speed of the Li—S battery, improve its coulombic efficiency and rate capability.

A Li—S battery cell 10 solving one or more of the above-mentioned disadvantages is disclosed herein. At least in one embodiment, depicted in FIG. 1, the cell 10 may include an anode 12 and a cathode 14. The anode 12 is the negative pole of the battery 10 during discharge.

The anode 12 may include an alkali metal. The alkali metal may be lithium. Lithium may be advantageous as the lightest and the most electropositive among the alkali metals. Lithium also has a low density of 0.534 g/cm³ which leads to the highest specific capacity value of 3.86 Ah/g among the alkali metals. Alternative anodic materials may include carbonaceous material allowing intercalation of Li within layers, hollow $Fe_3O_4$ nanoparticles, tin, ternary metal vanadates, metalloids, the like, or a combination thereof.

The cathode 14 may include one or more sulfur-impregnated carbon nanostructures 16. An enlarged schematic view of a portion of the cathode depicting a plurality of sulfur-impregnated carbon nanostructures 16 is depicted in FIG. 2.

FIGS. 3A and 3B show schematic views of an individual sulfur-impregnated carbon nanostructure 16. The carbon nanostructure 16 may include one or more layers 17 of nanoporous carbon 18. The amount of layers 17 may differ and may be about 1 to 10. Alternatively, the amount of layers 17 may be higher than 10, for example, 20, 30, 40, 50, or more. The total thickness of layers 17 may vary from about 1 nm to 500 nm, 10 nm to 250 nm, or 25 nm to 150 nm. The nanoporous carbon 18 may be based on graphene sheets, members of the fullerene structural family such as CNTs, nanospheres, nanoellipsoids, nanocones, nanocapsules, the like, or a combination thereof.

FIG. 4 shows a scanning electron microscope (SEM) image of the carbon nanostructure 16, depicting a CNT 20, emphasized by dashed lines for illustration purposes, surrounded by a doped carbon nanostructure 18.

The nanoporous carbon 18 may be elementally doped. Example dopant 21 may be boron, nitrogen, oxygen, sulfur, phosphorus, fluorine, or a combination thereof. The dopant 21 improves the electronic and structural properties of the graphene structures in the nanoporous carbon 18. The dopant 21 element(s) may be chosen from elements with a relatively low or relatively high electronegativity. The higher the electronegativity number, the more an element or structure attracts electrons towards it. Thus, the active sites 16 of the doped nanoporous carbon 18 are a polar electron-deficient or electron-rich structures having a high affinity for polysulfides. For example, the electronic properties of the active sites doped with boron result in a change of electronegativity of the carbon nanostructure 16 due to the low electronegativity of boron. The dopant 21 breaks the electroneutrality of $sp^2$ carbon to create charged sites favorable for polysulfide adsorption. The vacant $2p_z$ orbital of the dopant 21 conjugates with the carbon 7C system to extract the electrons. These electrons become active due to the low electronegativity of the dopant 21 and promote reduction of polysulfides on the positively charged doped sites. The active sites of the carbon nanostructure 16 are thus capable of effectively attracting and trapping various polysulfide species during charge-discharge cycles of the battery 10 via semi-chemical bonding. As a result, the shuttle effect is alleviated.

The shuttle effect is further alleviated as the carbon nanostructure 16 has a pore size of about 0.30 nm to 1 nm, 0.34 nm to 0.8 nm, or 0.4 nm to 0.6 nm. The average pore size may be about 0.34 nm. The carbon nanostructure 16 thus includes a nano-porous matrix of the nanoporous carbon 18 which is capable of physically confining the polysulfides while the dopant 21 can chemically bind the polysulfide species within the matrix. The nano-porous matrix has a better ability to confine polysulfides than a mesoporous structure having a larger pore size such as a porous graphene material with pores averaging at about 4.7 nm.

The elementally doped nanoporous carbon 18 is arranged on one or more CNTs 20. Each CNT 20 features a hollow structure with the walls formed by graphene, an allotrope of carbon in the form of a two-dimensional, atomic-scale honeycomb lattice in which one atom forms each vertex. The CNTs 20 represent seamless cylindrical hollow fibers. The CNTs 20 include a hexagonal lattice of covalently bonded carbon atoms having a regular arrangement of carbon atoms within the lattice. The CNTs 20 thus form straw-like cylinders of pure carbon. The CNTs 20 may be single-walled or multi-walled. Additionally, the CNTs 20 may be arranged into a variety of structures. Exemplary structures may include a nanobud combining CNTs 20 with fullerenes, a carbon torus referring to a CNT bent into a doughnut shape, graphitized CNTs 20 combining graphitic foliates grown along the sidewalls of multi-walled nanotubes, a carbon peapod referring to a CNT 20 with a trapped fullerene inside, cup-stacked CNTs 20 having a stacked microstructure of graphene layers, the like, or a combination thereof. The multi-walled CNTs 20 are made of coaxial cylinders having interlayer spacing close to that of the interlayer distance in graphite which is about 0.34 nm (3.4 Å). An example structure of the multi-walled CNT 20 may include a Russian nesting doll model referring to a set of concentric CNTs 20 of decreasing diameter placed one inside another or a parchment model referring to a nanotube sheet arranged as a partially unrolled scroll. The CNTs 20 may be capped with half of a fullerene molecule.

The CNTs 20 may have a diameter of about 5 nm to 50 nm, 10 nm to 40 nm, or 0.7 nm to 30 nm. The band gap may be about 0-2 eV. The CNTs 20 may have sufficient dimensions to form a network. The CNTs 20 may intertwine to form the network. The CNTs 20 within the network may have a random configuration. Alternatively, the network may have regularly spaced apart CNTs 20 such that the network displays a regular arrangement. The CNTs 20 within the network may have the same or different dimensions, orientation, alignment, helicity, properties, or the like. The CNTs 20 which are adjacent to each other may adhere together via dispersion forces between electrons.

The arrangement of the nanoporous carbon 18 and the CNTs 20 forming the sulfur-impregnated carbon nanostructure 16 may be such that the nanoporous carbon 18 and a CNT 20 are coaxial, as is schematically depicted in FIG. 3. The CNT 20 forms a central portion of the arrangement while the doped nanoporous carbon 18 forms one or more layers 17 arranged as an outer layer, surrounding the CNT 20. The carbon nanostructure 16 thus may have a tubular morphology. Alternatively, more than one CNT 20 may be surrounded with one or more layers 17 of the nanoporous carbon 18. The one or more CNTs 20 form a relatively small portion of the carbon nanostructure 18. For example, the CNT(s) 20 may form only about 1 to 30%, 5 to 20%, or 10 to 15% of the total volume of the carbon nanostructure 18. Consequently, the main portion of the carbon nanostructure 18 is formed by the one or more layers 17 of the nanoporous carbon 18.

Figure 5:
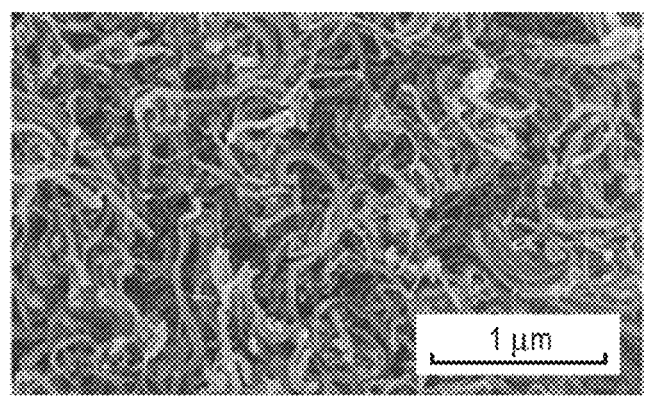
FIG. 5 is a SEM image of pristine carbon nanotubes.
Figure 6:
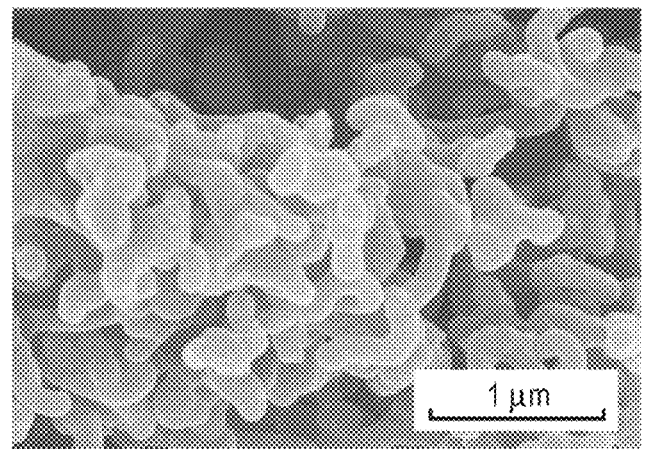

The diameter of the carbon nanostructure 18 may be about 100 to 300 nm, 150 to 250 nm, or 200 to 230 nm. The diameter of the carbon nanostructure 18 is thus significantly larger than the diameter of an individual CNT 20, which can be observed from FIGS. 5 and 6. FIG. 5 shows a plurality of pristine CNT precursors. FIG. 6 shows boron-doped carbon nanostructures 18 arranged on CNTs. FIGS. 7 and 8 represent additional SEM images of the doped carbon nanostructures 18.

A BET specific surface area of a CNT is about 163 $m^2/g$. In contrast, BET specific surface of the nanoporous carbon 18 may be about 400 to 500 $m^2/g$ due to presence of the carbon nanostructure 16.

The carbon nanostructure 16 may be sulfur-impregnated. Sulfur 23 may be uniformly distributed through the carbon nanostructure 16. Sulfur molecules 23 may be coated on top of the carbon nanostructure 16, be incorporated within the one or more layers 17 of the nanoporous carbon 18, or both. The content of sulfur 23 of the carbon nanostructure 16 may be about 10 to 60 wt. %, 20 to 50 wt. %, or 30 to 40 wt. %, based on the total weight of the sulfur-impregnated carbon nanostructure 16.

The battery cell 10 may further include an electrolyte 22. The electrolyte 22 may be configured to inhibit dissolution of lithium polysulfide intermediates in the electrolyte 22. The electrolyte 22 may be further capable of preventing deposition of the polysulfide intermediates on the anode 12. The electrolyte 22 is a gel-polymer electrolyte, a solid electrolyte, or a mixture thereof. In one or more embodiments, the electrolyte 22 may be mixed with a portion of a liquid electrolyte to increase ionic conductivity in the anode 12, the cathode 14, or both. The battery 10 may include about 1-50 wt. % of a liquid electrolyte, based on the total weight of the electrolyte 22. The liquid electrolyte may be surrounded by the electrolyte 22 such that the liquid electrolyte is enclosed within the electrolyte 22. Alternatively, the solid electrolyte 22 may be surrounded with the liquid electrolyte. Alternatively still, no liquid electrolyte may be included.

The electrolyte 22 may be configured to retain ionic transport at the electrode/electrolyte interface. The electrolyte 22 may be rigid or at least partially elastic. The elastic feature may assist in buffering and/or compensating volume changes of the cathode 14 during the charge-discharge cycle.

The electrolyte 22 may include a polymeric binder such as polyacrylonitrile (PAN), polyvinylidene fluoride (PVdF), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (P(VdF-CTFE)), poly(methyl methacrylate-vinyl acetate) (P(MMA-VAc)), poly(ethylene glycol) diacrylate (PEGDA), poly(methyl methacrylate-acrylonitrile-vinyl acetate) (P(MMA-AN-VAc)), poly(methyl methacrylate-co-butyl acrylate) (P(MMA-co-BA)), poly(3,4-ethylenedioxythiophene) polystyrene sulfonate-co-polyethylene glycol (PEDOT-co-PEG), Li-ion containing polymer such as poly (lithium 4-styrenesulfonate), the like, or a combination thereof.

The electrolyte 22 may further include a solvent/an organic liquid such as dimethylformamide (DMF), N-Methyl-2-pyrrolidone (NMP), dimethylacetamide (DMAc), triethyl phosphate (TEP), acetone, tetrahydrofuran (THF), dimethyl sulfoxide (DMSO), the like, or a combination thereof. The solvent may be a carbonate solvent such as ethylene carbonate, dimethyl carbonate (DMC), diethyl carbonate, propylene carbonate, or other organic carbonates, or include a mixture of various carbonate solvents. The solvent may be a non-carbonate solvent such as dimethoxyethane ($C_4H_{10}O_2$), butyrolactone ($C_4H_6O_2$), methylbutyrate ($C_5H_{10}O_2$), perfluoropolyether (PFPE), tetrahydrofuran (THF), ionic liquids, or their combination, or include a mixture of non-carbonate and carbonate solvents.

The electrolyte 22 may further include hydrophilic particles 28. The hydrophilic nature of the particles may facilitate absorption of liquid in polymer pores, thus enhancing ionic conductivity of the electrolyte. The particles may reinforce the mechanical strength of the electrolyte 22. The particles may be any kind of a filler. For example, the nanoparticles may be ceramic particles. The particles may include oxides such as silica, alumina, zirconia, and/or non-oxides such as carbides, borides, nitrides, silicides. The particles may include metal oxides such as $Al_2O_3$, $SiO_2$, TiC, SiC, $TiO_2$, $CeO_2$, MgO, $ZrO_2$, $MgAl_2O_4$, $BaTiO_3$; NiO; hydroxides such as $AlO(OH)_n$, $Mg(OH)_2$, $Al(OH)_3$; molecular sieves; $AlF_3$; zeolites such as MFI zeolites; Li-ion conducting ceramics such as $LiAlO_2$, $Li_{0.1}Ca_{0.9}TiO_3$, $LiTi_2(PO_4)_3$, $Li_{3x}La_{2/3-x}TiO_3$, $Li_{1.5}Al_{0.5}Ge_{1.5}(PO_4)_3$, or a combination thereof.

The particle size may be about 5 nm to 100 μm. The particle size may be the same or vary throughout the electrolyte 22. The particles may be evenly dispersed within the electrolyte 22. Alternatively, the particles may be present in clusters or distributed unevenly within the electrolyte 22.

The electrolyte 22 may further include 1-ethyl-3-methyl-imidazolium-bis (trifluoromethyl-sulfonyl)imide (EMITFSI), 1-etyl-3-methylimidazolium bis(fluorosulfonyl)imide (EMIFSI), lithium bis(fluorosulfonyl)imide (PYR14TFSI), 1-methyl-3-butylimidazolium tetrafluoroborate (BMIBF4), N-Methyl-N-propylpiperidinium bis(trifluoromethanesulfonyl)imide (PP13TFSI), or another ionic liquid to increase ionic conductivity at the anode 12, the cathode 14, or both.

The electrolyte 22 may be gelled or solidified with a mixture of lithium salts 31 such as lithium hexafluorophosphate ($LiPF_6$), lithium tetrafluoroborate ($LiBF_4$), lithium perchlorate ($LiClO_4$), lithium bis(oxalate)borate (LiBOB), lithium oxalyldifluoroborate (LiODFB), bis(trifluoromethane)sulfonamide lithium (LiTFSI) and a solvent such as one or more solvents named above, and/or one or more ionic liquids named above.

The structure of the electrolyte 22 may include a ceramic membrane 32, a substrate membrane 34, or both. The ceramic membrane 32 may be formed by combining one or more polymeric binders, one or more solvents, a plurality of particles, and optionally one or more ionic liquids, according to a method described below. As is apparent from FIG. 9A, the electrolyte structure may include just the ceramic membrane 32 located between the cathode 14 and the anode 12. The ceramic membrane 32 may have a thickness of about 2 to 30 μm, 5 to 20 μm, or 10 to 15 μm.

Alternatively, as is depicted in FIG. 9B, the electrode 22 may include one or more ceramic membranes 32 located on one or both sides of the substrate membrane 34. The substrate membrane 34 may include one or more layers of a porous membrane material such as a polyolefin membrane containing polyethylene, polypropylene, or the like, a non-woven membrane such as polyethylene terephthalate (PET), the like, or a combination thereof. The thickness of the substrate membrane 34 may be about 8 to 30 μm, 10 to 20 μm, or 12 to 15 μm. The thickness of the ceramic membrane 32 in this embodiment may be as described above or about 2 to 10 μm.

Figure 10:
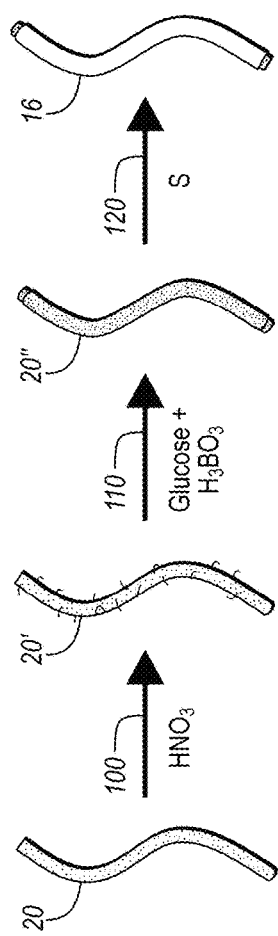
FIG. 10 schematically depicts a series of method steps to produce a sulfur-impregnated carbon nanostructure.

In one or more embodiments, a method of producing the battery cell 10 is disclosed. The method may include preparing the cathode 14 described above. The method may further include preparation of the sulfur-impregnated carbon nanostructure 16, schematically depicted in FIG. 10. The method may be a thermal treatment method. At step 100, the method includes modifying one or more CNTs 20 by refluxing the CNT(s) 20 in $HNO_3$ and subsequently washing the CNT(s) 20 in distilled water. Refluxing may be conducted at about 120° C. for about 5 hours. Different temperature and duration of refluxing is contemplated. The modified CNT(s) 20' may be dispersed in water containing sodium dodecyl sulfate to form a CNT suspension. At step 110, the nanoporous carbon 18 may be synthesized from an aqueous mixture of glucose and $H_3BO_3$. The aqueous mixture may be added to the CNT suspension to form a homogenous suspension. The homogenous suspension may be sealed and held in an oven at about 190° C. for about 15 hours. Different temperature and duration of heating is contemplated. The product 20" may be collected by vacuum filtration. The product 20" may be dried in a vacuum oven and subsequently carbonized in an Ar atmosphere. At step 120, the carbonized product 20" may be impregnated with sulfur. The sulfur-impregnated carbon nanostructure 16 is ready for electrode fabrication.

The method may further include preparation of the electrolyte 22. The method combines one or more polymeric binders, one or more solvents, and hydrophilic particles. The components are stirred together to form a slurry. A porous membrane is formed from the slurry as the solvent evaporates, and the membrane is dried. The resulting membrane is a non-liquid membrane or ceramic membrane 32. The ceramic membrane 32 may be used as a solid or gel electrolyte 22 after being gelled with a mixture of lithium salts, one or more solvents, and/or one or more ionic liquids named above.

In at least one embodiment, the slurry may be coated onto a substrate membrane 34. Alternatively, a pre-formed ceramic membrane 32 may be attached to a substrate membrane 34. The ceramic membrane 32 may be adhered to one or both sides of the substrate membrane 34. The method includes gelling or solidifying the electrolyte 22 according to the description provided above.

Example

Figure 11:
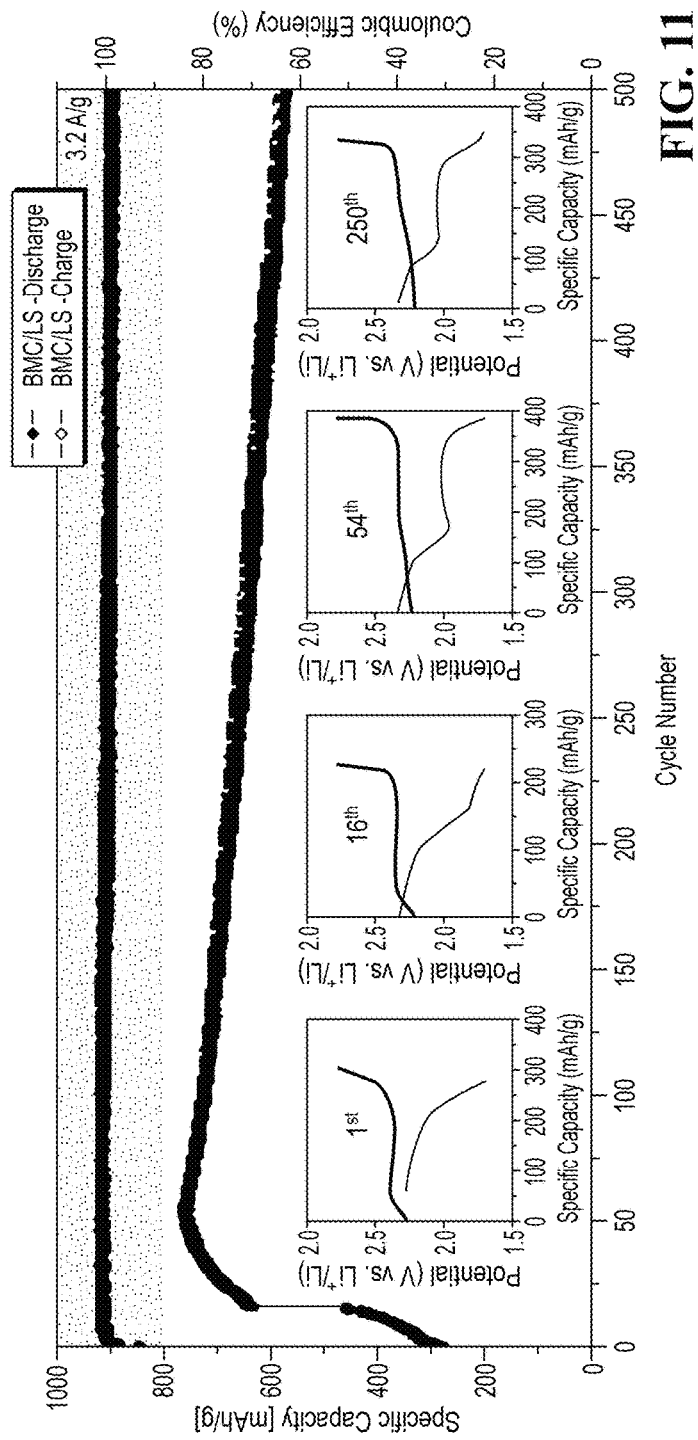
FIG. 11 is a plot depicting specific capacity and coulombic efficiency v. cycle number for charge/discharge voltage profiles on several different cycles for an example Li—S battery having a cathode containing sulfur-impregnated carbon nanostructures.

Cycle performance of a Li—S battery including a cathode containing sulfur-impregnated (sulfur at 59 wt. %) carbon nanostructures 16 prepared according to the method described above was tested at 3.2 A/g. The testing results are presented in FIG. 11 and in Table 1 below. At the beginning of a charge-discharge cycle, the battery cell 10 underwent a reactivation process, and the discharge capacity increased in the first 54 cycles. It is contemplated that sulfur was unable to dissolve into the electrolyte in a fast manner. The highest discharge capacity of 749.5 mAh/g was obtained at the 54th cycle. After 500 cycles, the discharge capacity was 561.8 mAh/g, corresponding to a capacity retention of 74.96% of its highest value and a very small capacity decay of 0.056% per cycle. During cycling, the coulombic efficiency remained above 97%.

TABLE 1

Cycle performance testing results for a Li—S battery having a cathode containing sulfur-impregnated carbon nanostructures.

| Cycle Number | Discharge Capacity [mAh/g] | Coulombic Efficiency [%] |
|---|---|---|
| 1 | 272.9 | 91.91647 |
| 16 | 446.3 | 99.59830 |
| 54 | 749.5 | 99.53519 |
| 100 | 715.7 | 99.37517 |
| 150 | 691.7 | 99.11162 |
| 200 | 670.1 | 98.68925 |
| 300 | 630.2 | 98.33047 |
| 400 | 593.9 | 97.80962 |
| 500 | 561.8 | 97.68736 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A lithium-sulfur battery cell comprising:
a lithium anode; and
a carbon-sulfur cathode including a sulfur-impregnated carbon nanostructure including one or more carbon nanotubes surrounded by a plurality of concentric layers of nanoporous carbon such that the carbon nanotubes form about 1% to 30% of the total volume of the carbon nanostructure.

2. The battery cell of claim 1, wherein the nanoporous carbon is doped with boron.

3. The battery cell of claim 1, wherein the one or more carbon nanotubes and the nanoporous carbon are coaxial.

4. The battery cell of claim 1, wherein the carbon nanostructure includes active sites configured to trap lithium polysulfide intermediates during charge-discharge of the battery.

5. The battery cell of claim 1, wherein the carbon nanostructure has a tubular morphology.

6. The battery cell of claim 1, wherein a pore size of the nanoporous carbon is about 0.30 nm to about 0.34 nm.

7. The battery cell of claim 1, wherein the carbon nanostructure has a BET specific surface of about 400 $m^2/g$.

8. The battery cell of claim 1, wherein sulfur is uniformly distributed throughout the carbon nanostructure.

9. A lithium-sulfur battery cell comprising:
a lithium anode;
a carbon-sulfur cathode including a sulfur-impregnated carbon nanostructure including one or more carbon nanotubes surrounded by a plurality of concentric layers of nanoporous carbon; and
a solid or gel polymer electrolyte configured to inhibit dissolution of lithium polysulfide intermediates in the electrolyte and prevent deposition of the intermediates on the anode, the electrolyte comprising poly(vinylidenefluoride-hexafluoropropylene) and hydrophilic ceramic particles, and about 50 wt. % of a liquid electrolyte, based on the total weight of the solid or gel polymer electrolyte.

10. The battery cell of claim 9, wherein the ceramic particles are silicon dioxide particles.

11. The battery cell of claim 9, further comprising 1-ethyl-3-methylimidazolium-bis (trifluoromethyl-sulfonyl)imide.

12. The battery cell of claim 9, wherein the solid or gel electrolyte is surrounded by the liquid electrolyte.

13. The battery cell of claim 9, wherein porosity of the cathode is about 15-25%.

14. A lithium-sulfur battery cell comprising:
a lithium anode;
a carbon-sulfur cathode including a sulfur-impregnated carbon nanostructure including one or more carbon nanotubes surrounded by a plurality of concentric layers of elementally doped nanoporous carbon having a pore size of about 0.30-0.034 nm, wherein the sulfur is uniformly distributed through the entire carbon nanostructure; and
a non-liquid electrolyte configured to inhibit dissolution of lithium polysulfide intermediates in the electrolyte and prevent deposition of the intermediates on the anode.

15. The battery cell of claim 14, wherein the non-liquid electrolyte comprises poly(vinylidenefluoride-hexafluoropropylene), hydrophilic ceramic particles, and optionally comprising 1-ethyl-3-methylimidazolium-bis (trifluoromethyl-sulfonyl)imide.

16. The battery cell of claim 14, wherein the elementally doped nanoporous carbon is doped with boron.

17. The battery cell of claim 9, wherein the carbon nanotubes form a network.

18. The battery cell of claim 14, wherein the electrolyte includes ceramic membrane and a substrate membrane.

* * * * *